United States Patent
Harmon

(10) Patent No.: US 10,673,899 B1
(45) Date of Patent: Jun. 2, 2020

(54) SYSTEMS AND METHODS FOR ENFORCING ACCESS-CONTROL POLICIES

(71) Applicant: Symantec Corporation, Mountain View, CA (US)

(72) Inventor: Justin Harmon, Knoxville, TN (US)

(73) Assignee: NortonLifeLock Inc., Tempe, AZ (US)

(*) Notice: Subject to any disclaimer, the term of this patent is extended or adjusted under 35 U.S.C. 154(b) by 171 days.

(21) Appl. No.: 15/156,719

(22) Filed: May 17, 2016

(51) Int. Cl.
*H04L 29/06* (2006.01)
*H04W 84/12* (2009.01)

(52) U.S. Cl.
CPC .............. *H04L 63/20* (2013.01); *H04L 63/08* (2013.01); *H04L 63/10* (2013.01); *H04L 63/102* (2013.01); *H04L 67/42* (2013.01); *H04W 84/12* (2013.01)

(58) Field of Classification Search
CPC ......... H04L 63/20; H04L 63/10; H04L 63/08; H04L 63/102
See application file for complete search history.

(56) References Cited

U.S. PATENT DOCUMENTS

| | | | | |
|---|---|---|---|---|
| 7,051,087 B1* | 5/2006 | Bahl | ................... | H04L 29/1232 709/220 |
| 8,578,444 B2* | 11/2013 | Lum | ................... | H04L 63/0876 726/1 |
| 9,240,996 B1* | 1/2016 | Sinnema | ................. | H04L 63/10 |
| 9,712,376 B2* | 7/2017 | Kolesnik | ................. | H04L 41/00 |
| 2003/0101247 A1* | 5/2003 | Kumbalimutt | ........ | H04L 41/082 709/221 |
| 2003/0115344 A1* | 6/2003 | Tang | ................... | H04L 63/0272 709/229 |
| 2004/0103308 A1* | 5/2004 | Paller | ..................... | H04L 63/10 726/12 |
| 2006/0233180 A1* | 10/2006 | Serghi | ..................... | H04L 29/06 370/401 |
| 2008/0005344 A1* | 1/2008 | Ford | ................. | H04L 29/12283 709/230 |
| 2009/0285190 A1* | 11/2009 | Baron | ................. | H04L 12/2867 370/338 |
| 2010/0064340 A1* | 3/2010 | McCorkendale | ... | G06F 21/6218 726/1 |
| 2011/0055900 A1* | 3/2011 | Chua | ...................... | H04L 63/08 726/4 |

(Continued)

OTHER PUBLICATIONS

Y. Cheng et al., "Managing network security policies in tactical MANETs using Drama," 2010—MILCOM 2010 Military Communications Conference, San Jose, CA, 2010, pp. 960-964. (Year: 2010).*

(Continued)

*Primary Examiner* — Kari L Schmidt
(74) *Attorney, Agent, or Firm* — FisherBroyles, LLP

(57) ABSTRACT

The disclosed computer-implemented method for enforcing access-control policies may include (1) detecting, at a network device capable of configuring networks according to access-control policies, an attempt to connect a client to an access-controlled network, (2) identifying an access-control policy that applies to the access-controlled network, (3) configuring the access-controlled network according to the access-control policy, and (4) notifying the client that the access-controlled network is available. Various other methods, systems, and computer-readable media are also disclosed.

20 Claims, 6 Drawing Sheets

(56) References Cited

U.S. PATENT DOCUMENTS

| | | | | |
|---|---|---|---|---|
| 2011/0153854 A1* | 6/2011 | Chickering | H04L 63/0815 | 709/229 |
| 2013/0246639 A1* | 9/2013 | Nedbal | H04L 63/101 | 709/228 |
| 2013/0298182 A1* | 11/2013 | May | H04L 63/0272 | 726/1 |
| 2013/0318573 A1* | 11/2013 | Reunamaki | H04W 12/04 | 726/4 |
| 2014/0068030 A1* | 3/2014 | Chambers | H04L 41/0809 | 709/220 |
| 2014/0068655 A1* | 3/2014 | Nakaya | H04N 21/4126 | 725/28 |
| 2014/0123215 A1* | 5/2014 | Nakae | H04L 45/125 | 726/1 |
| 2014/0282817 A1* | 9/2014 | Singer | H04L 63/08 | 726/1 |
| 2016/0050214 A1* | 2/2016 | Chambers | H04L 41/0809 | 726/1 |
| 2016/0352731 A1* | 12/2016 | Mentze | H04L 12/6418 | |
| 2017/0013016 A1* | 1/2017 | Wong | H04L 63/20 | |
| 2018/0183806 A1* | 6/2018 | Nambisan | H04L 29/06 | |
| 2018/0293823 A1* | 10/2018 | Gillot | G07C 9/00571 | |

OTHER PUBLICATIONS

Liu, Alex, and Amir Khakpour. "Quantifying and verifying reachability for access controlled networks." IEEE/ACM Transactions on Networking 21.2 (2012): 551-565. (Year: 2012).*

Lei Gu, et al..; Systems and Methods for Automatically Adjusting Access-Control Policies; U.S. Appl. No. 15/017,954, filed Feb. 8, 2016.

Privacy and Parental Control; http://www.gosnetworks.com/solutions/parental-control, as accessed Mar. 22, 2016; GoS Networks; Jul. 8, 2013.

* cited by examiner

SYSTEMS AND METHODS FOR ENFORCING ACCESS-CONTROL POLICIES

BACKGROUND

Individuals and organizations frequently seek to control how others under their control access network services and/or digital media. For example, a parent may wish to enforce parental controls on computers, televisions, and smart phones in their household in order to control their child's access to various digital media. Similarly, an organization may wish to limit websites that its employees can access during work hours.

Unfortunately, enforcing access-control policies may become problematical when mobile devices move from the device's primary network. For example, a child may take a tablet or smartphone to a friend's home, or an employee may take a notebook computer to a coffee shop with an open Wi-Fi network. Moving a client device away from its primary network may remove the device from the control of routers, gateways, or proxy servers that are configured to help enforce access-control policies. Accordingly, the instant disclosure identifies and addresses a need for additional and improved systems and methods for enforcing access-control policies.

SUMMARY

As will be described in greater detail below, the instant disclosure describes various systems and methods for enforcing access-control policies by identifying a client device attempting to connect to an access-controlled network, identifying an access-control policy that applies to the access-controlled network, and configuring a network according to the access-control policy. The client device may then be notified of the availability of the access-controlled network. By configuring an access-controlled network according to an access-control policy that applies to a client device, the disclosed systems and methods may facilitate enforcing access-control policies outside of the client device's primary network.

In one example, a computer-implemented method for enforcing access-control policies may include (1) detecting, at a network device capable of configuring networks according to access-control policies, an attempt to connect a client to an access-controlled network, (2) identifying an access-control policy that applies to the access-controlled network, (3) configuring the access-controlled network according to the access-control policy, and (4) notifying the client that the access-controlled network is available.

In one embodiment, detecting the connection attempt may include detecting a request from the client to connect to the access-controlled network and identifying the access-control policy may include retrieving the access-control policy that applies to the access-controlled network from an access-control policy server. In one example, detecting the connection attempt may include detecting the network device capable of configuring networks according to access-control policies and identifying the access-control policy may include requesting an access-control policy server to provide the access-control policy to the network device. In some embodiments, the client may request, via a mobile device network, the access-control policy server to provide the access-control policy to the network device. In one embodiment, the client may request, via a public network, the access-control policy server to provide the access-control policy to the network device. In one example, the public network may be provided by the network device.

In some embodiments, detecting the attempt to connect the client to the access-controlled network may include receiving, at an access-control policy server, a request to identify the network device, with the request including one or more network device identifiers. In this embodiment, identifying the access-control policy that applies to the access-controlled network may include receiving, at the access-control policy server, identification of the access-control policy and providing the access-control policy to the network device.

In one embodiment, a system for implementing the above-described method may include several modules stored in memory, such as (1) a connection module that detects, at a network device capable of configuring networks according to access-control policies, an attempt to connect a client to an access-controlled network, (2) a policy module that identifies an access-control policy that applies to the access-controlled network, (3) a configuration module that configures the access-controlled network according to the access-control policy, and/or (4) a notification module that notifies the client that the access-controlled network is available. The system may also include at least one physical processor configured to execute the connection module, the policy module, the configuration module, and the notification module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) detect, at a network device capable of configuring networks according to access-control policies, an attempt to connect a client to an access-controlled network, (2) identify an access-control policy that applies to the access-controlled network, (3) configure the access-controlled network according to the access-control policy, and (4) notify the client that the access-controlled network is available.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of illustrative embodiments and are a part of the specification. Together with the following description, these drawings demonstrate and explain various principles of the instant disclosure.

Figure 1:
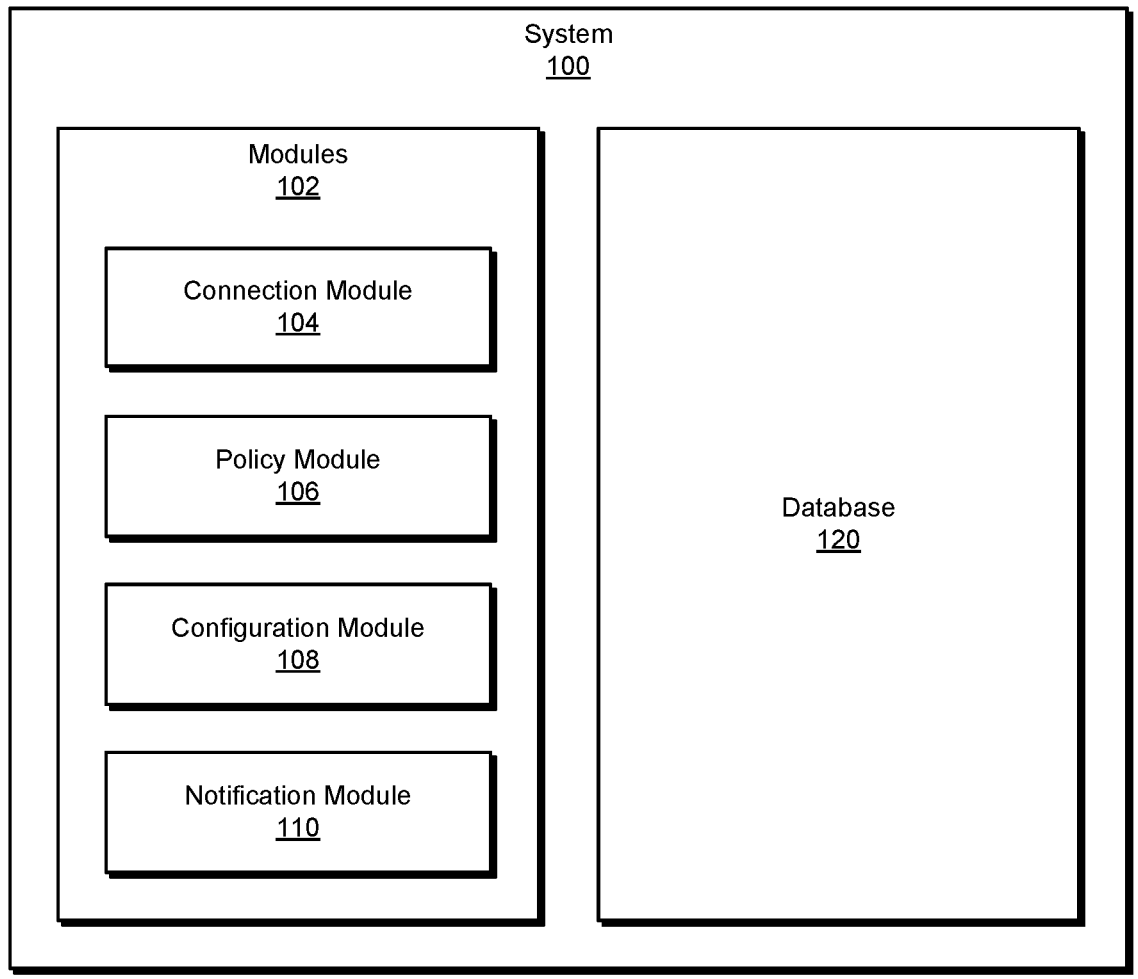
FIG. 1 is a block diagram of an illustrative system for enforcing access-control policies.

Throughout the drawings, identical reference characters and descriptions indicate similar, but not necessarily identical, elements. While the illustrative embodiments described herein are susceptible to various modifications and alternative forms, specific embodiments have been shown by way of example in the drawings and will be described in detail herein. However, the illustrative embodiments described herein are not intended to be limited to the particular forms disclosed. Rather, the instant disclosure covers all modifications, equivalents, and alternatives falling within the scope of the appended claims.

DETAILED DESCRIPTION OF ILLUSTRATIVE EMBODIMENTS

The present disclosure is generally directed to systems and methods for enforcing access-control policies. As will be explained in greater detail below, the systems and methods described herein may determine that a client device is attempting to connect to an access-controlled network and, in response, (1) identify an access-control policy that applies to the network to which the client device is attempting to connect and (2) configure the network according to the identified access-control policy. The systems and methods described herein may then notify the client device of the availability of the access-controlled network. In this way, the disclosed systems and methods may facilitate consistent enforcement of an access-control policy for a client device when away from its primary network location.

Figure 2:
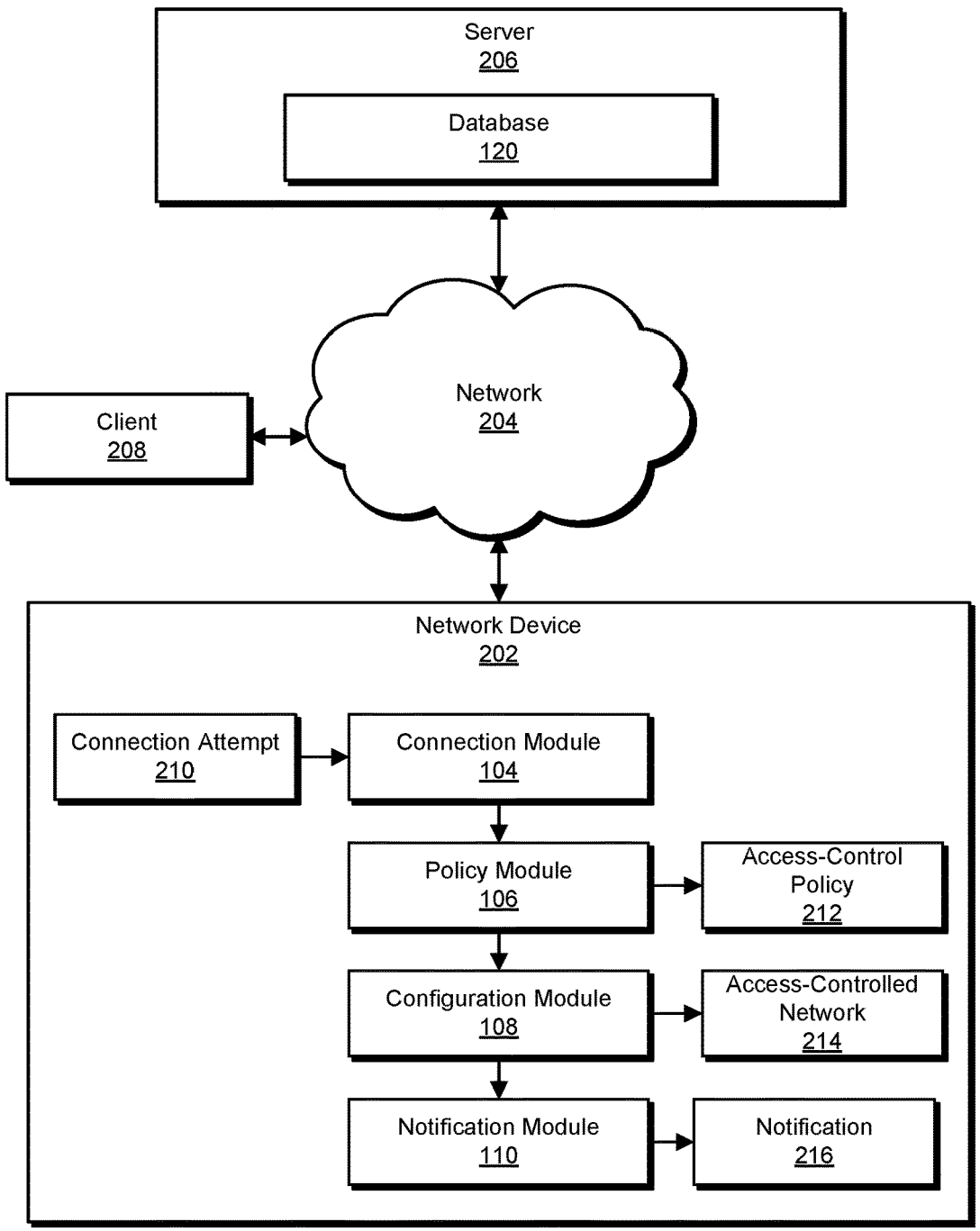
FIG. 2 is a block diagram of an additional illustrative system for enforcing access-control policies.
Figure 3:
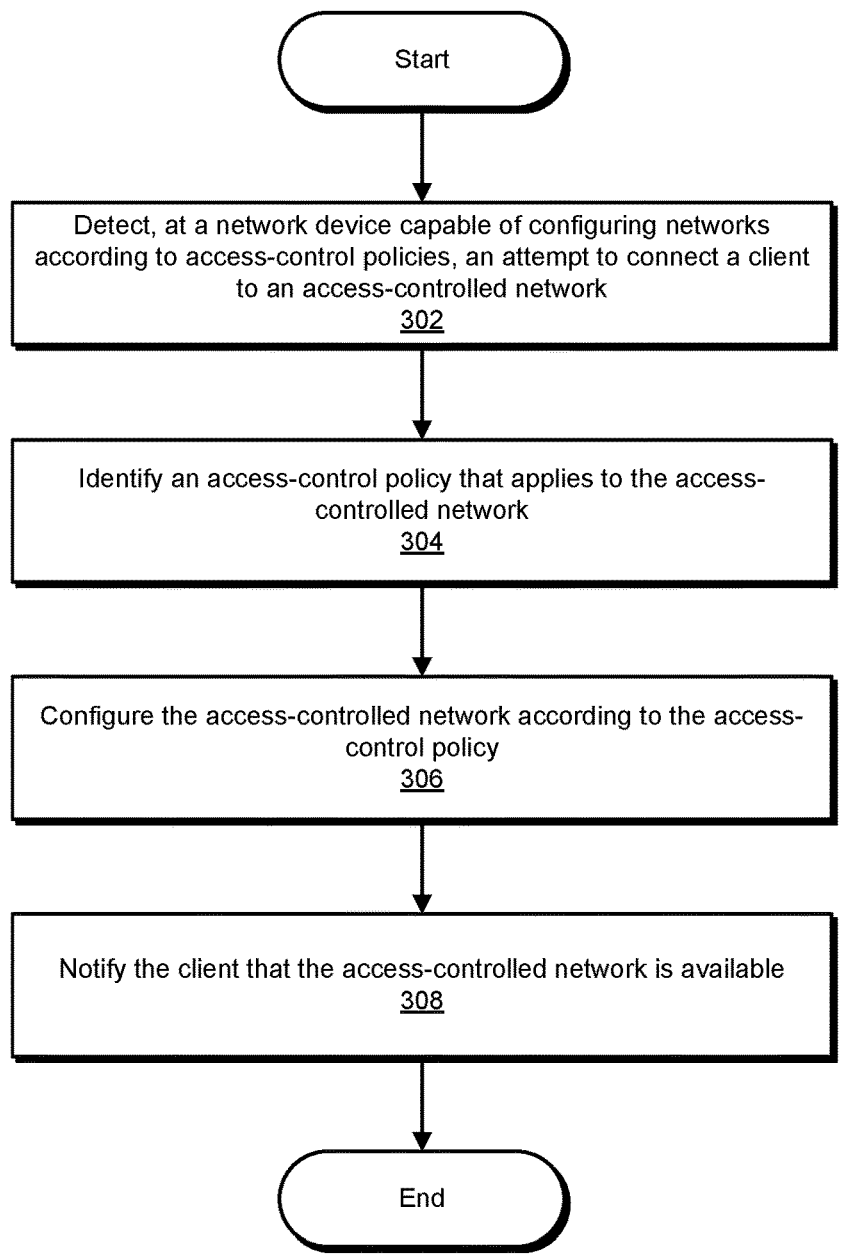
FIG. 3 is a flow diagram of an illustrative method for enforcing access-control policies.
Figure 4:
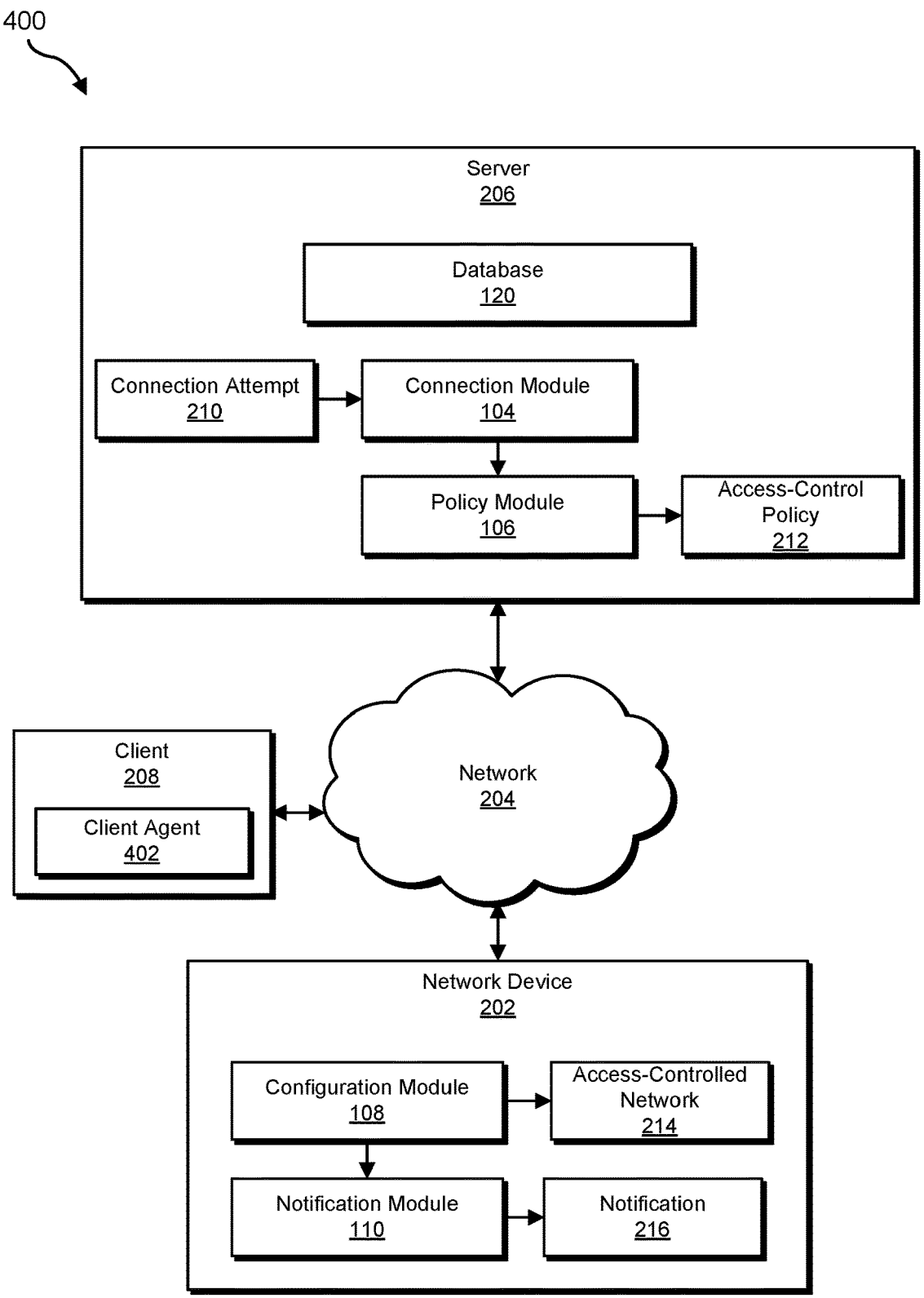
FIG. 4 is a block diagram of an additional illustrative system for enforcing access-control policies.

The following will provide, with reference to FIGS. 1, 2, and 4 detailed descriptions of illustrative systems for enforcing access-control policies. Detailed descriptions of corresponding computer-implemented methods will also be provided in connection with FIG. 3. In addition, detailed descriptions of an illustrative computing system and network architecture capable of implementing one or more of the embodiments described herein will be provided in connection with FIGS. 5 and 6, respectively.

FIG. 1 is a block diagram of illustrative system 100 for enforcing access-control policies. As illustrated in this figure, illustrative system 100 may include one or more modules 102 for performing one or more tasks. For example, and as will be explained in greater detail below, illustrative system 100 may include a connection module 104 that detects, at a network device capable of configuring networks according to access-control policies, an attempt to connect a client to an access-controlled network. Illustrative system 100 may additionally include a policy module 106 that identifies an access-control policy that applies to the access-controlled network. Illustrative system 100 may also include a configuration module 108 that configures the access-controlled network according to the access-control policy. Illustrative system 100 may additionally include a notification module 110 that notifies the client that the access-controlled network is available. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., network device 202 and/or server 206), computing system 510 in FIG. 5, and/or portions of illustrative network architecture 600 in FIG. 6. One or more of modules 102 in FIG. 1 may also represent all or portions of one or more special-purpose computers configured to perform one or more tasks.

As illustrated in FIG. 1, illustrative system 100 may also include one or more databases, such as database 120. In one example, database 120 may be configured to store access-control policies and/or network configuration information. Database 120 may represent portions of a single database or computing device or a plurality of databases or computing devices. For example, database 120 may represent a portion of server 206 in FIG. 2, computing system 510 in FIG. 5, and/or portions of illustrative network architecture 600 in FIG. 6. Alternatively, database 120 in FIG. 1 may represent one or more physically separate devices capable of being accessed by a computing device, such as server 206 in FIG. 2, computing system 510 in FIG. 5, and/or portions of illustrative network architecture 600 in FIG. 6.

Illustrative system 100 in FIG. 1 may be implemented in a variety of ways. For example, all or a portion of illustrative system 100 may represent portions of illustrative system 200 in FIG. 2. As shown in FIG. 2, system 200 may include a network device 202 in communication with a server 206 via a network 204. In one example, network device 202 may be programmed with one or more of modules 102 and/or may store all or a portion of the data in database 120. Additionally or alternatively, server 206 may be programmed with one or more of modules 102 and/or may store all or a portion of the data in database 120.

In one embodiment, one or more of modules 102 from FIG. 1 may, when executed by at least one processor of network device 202 and/or server 206, enable network device 202 and/or server 206 to enforce access-control policies. For example, and as will be described in greater detail below, connection module 104 may detect, at a network device 202 capable of configuring networks according to access-control policies, an attempt to connect a client 208 to an access-controlled network 214. Policy module 106 may then identify an access-control policy 212 that applies to access-controlled network 214. Configuration module 108 may then configure access-controlled network 214 according to access-control policy 212. Finally, notification module 110 may notify client 208 that access-controlled network 214 is available.

Network device 202 generally represents any type or form of computing device capable of reading computer-executable instructions. Examples of network device 202 include, without limitation, routers, gateways, proxy servers, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, illustrative computing system 510 in FIG. 5, or any other suitable computing device.

Server 206 generally represents any type or form of computing device that is capable of communicating, storing, and/or comparing data. Examples of server 206 include, without limitation, application servers and database servers configured to provide various database services and/or run certain software applications.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), illustrative network architecture 600 in FIG. 6, or the like. Network 204 may facilitate communication or data transfer using wireless or wired connections. In one embodiment, network 204 may facilitate communication between network device 202 and server 206.

FIG. 3 is a flow diagram of an illustrative computer-implemented method 300 for enforcing access-control policies. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 510 in FIG. 5, and/or portions of illustrative network architecture 600 in FIG. 6.

As illustrated in FIG. 3, at step 302, one or more of the systems described herein may detect, at a network device capable of configuring networks according to access-control policies, an attempt to connect a client to an access-controlled network. For example, connection module 104 may, as part of network device 202 in FIG. 2, detect, at a network device 202 that is capable of configuring networks according to access-control policies, an attempt to connect client 208 to an access-controlled network.

The term "access-controlled network," as used herein, generally refers to a network configured to enforce an access-control policy. An access-controlled network may include, without limitation, configurable elements such as client agents, browser extensions, routers, gateways, network firewalls, and/or proxy servers. Additionally, an access-controlled network may, for example, restrict the amount of time a client may access the network, the time of day a client may access the network, content that may be accessed, network servers that may be contacted, and/or purchases that may be made.

Connection module 104 may detect an attempt to connect a client to an access-controlled network in a variety of ways. For example, network device 202 may represent a network infrastructure device, such as a wireless router. In addition, connection attempt 210 may represent a probe request attempting to connect to a specified wireless network. In this example, connection module 104 may (while executing on network device 202) receive connection attempt 210 from client 208 requesting a connection to a network identified by a service set identifier (SSID). Connection attempt 210 may also include a basic service set identification (BSSID), typically the MAC address of the last access point to which the client connected. As such, connection module 104 may (while executing on network device 202) contact server 206 to determine whether the network identified in connection attempt 210 is an access-controlled network.

In another example, connection module 104 may execute on server 206. In this example, connection module 104 may detect connection attempt 210 when a client agent executing on client 208 contacts connection module 104. For example, and as will be described in greater detail below in connection with FIG. 4, client 208 may contact connection module 104 (executing on server 206) to determine whether network device 202 is capable of configuring an access-controlled network. In one example, client 208 may be a smartphone that, after identifying network device 202 as a wireless router, may contact server 206 over a wireless data network. Client 208 may then identify an access-controlled network to which client 208 previously connected and/or an access-control policy 212 that applies to client 208 and request that (1) server 206 contact network device 202 and (2) network device 202 configure an access-controlled network according to the applicable access-control policy 212.

In another example, network device 202 may provide a guest network configured to allow client 208 to contact connection module 104 running on server 206. In this example, client 208 may request that (1) connection module 104 contact network device 202 and (2) network device 202 configure an access-controlled network according to the applicable access-control policy 212.

At step 304, one or more of the systems described herein may identify an access-control policy that applies to the access-controlled network. For example, policy module 106 may, as part of network device 202 in FIG. 2, identify an access-control policy 212 that applies to an access-controlled network to which client 208 is attempting to connect.

Policy module 106 may identify an access-control policy that applies to an access-controlled network in a variety of ways. In one embodiment, connection module 104 may detect the connection attempt by detecting a request from the client to connect to the access-controlled network. For example, policy module 106 may receive the SSID of a network to which client 208 previously connected in connection attempt 210. As mentioned above, client 208 may include the SSID in a probe request when attempting to connect to a wireless network. The probe request may also include the BSSID of the access point to which client 208 last connected to an access-controlled network.

In one embodiment, identifying the access-control policy may include retrieving the access-control policy that applies to the access-controlled network from an access-control policy server. For example, policy module 106 may contact server 206 to request that server 206 provide an access-control policy 212 that applies to the identified network to network device 202. In some examples, it may be advantageous to use a BSSID to identify access-control policy 212 since the BSSID may uniquely identify the access-control policy, while SSIDs are not guaranteed to be unique. If access-control policy 212 is to be identified using an SSID, the SSID of access-controlled networks may include a unique identifier in the SSID to ensure that the applicable access-control policy 212 is specified uniquely.

In another example, policy module 106 (executing on server 206) may retrieve the access-control policy that applies to the access-controlled network by retrieving the access-control policy identified by client 208 in connection attempt 210 when requesting that server 206 provide access-control policy 212 to network device 202. As mentioned above, client 208 may contact server 206 in a variety of ways. For example, client 208 may contact server 206 via a wireless data network, such as a 3G or 4G network. In another example, client 208 may contact server 206 via an open Wi-Fi network or other public network. In some examples, network device 202 may provide an open Wi-Fi network that is configured to only allow clients connecting to the network to contact access-control servers, such as server 206.

At step 306, one or more of the systems described herein may configure the access-controlled network according to the access-control policy. For example, configuration module 108 may, as part of network device 202 in FIG. 2, configure access-controlled network 214 according to access-control policy 212.

Configuration module 108 may configure the access-controlled network in a variety of ways. For example, configuration module 108 may create a network with the same SSID as a network to which client 208 attempted to connect. Configuration module 108 may also configure access-controlled network 214 to enforce provisions of access-control policy 212, such as allowing connection to the network during specified hours of the day or for a specified period of time or blocking communication with specified network servers. Configuration module 108 may also route network traffic from client 208 to a proxy server that administers provisions of access-control policy 212.

FIG. 4 is a block diagram of an illustrative system 400 for enforcing access-control policies. System 400 may include components of system 200 shown in FIG. 2. As show in this figure, connection module 104 and policy module 106 may execute on server 205. Additionally, client 208 may include client agent 402. In one embodiment, connection module 104 may detect the attempt to connect the client to the access-controlled network by receiving, at an access-control policy server, a request to identify the network device, with the request including at least one network device identifier. For example, client agent 402 may detect network device 202 and obtain information identifying network device 202, such as an IP address or MAC address. Client agent 402 may then contact connection module 104, provide the information identifying network device 202, and request that server 206 provide access-control policy 212 to network device 202. Policy module 106 may then provide access-control policy 212 to configuration module 108 executing on network device 202 so that network device 202 may configure access-controlled network 214 according to access-control policy 212.

Returning to FIG. 3, at step 308, one or more of the systems described herein may notify the client that the access-controlled network is available. For example, notification module 110 may, as part of network device 202, provide notification 216 to notify client 208 that access-controlled network 214 is available.

Notification module 110 may notify client 208 that access-controlled network 214 is available in a variety of ways. For example, notification module 110 may broadcast the SSID of access-controlled network 214 so that client 208 may discover and connect to access-controlled network 214. In another example, if network device 202 provides a public network to facilitate communication between client 208 and server 206, network device 202 may notify client agent 402 executing on client 208 both that access-controlled network 214 is available and that client 208 may disconnect from the public network and reconnect to access-controlled network 214.

As described in greater detail above, the systems and methods described herein may enforce access-control policies by configuring and providing an access-controlled network according to an access-control policy that applies to a client attempting to establish network access. By doing so, the systems and methods described herein may help extend an individual or organization's access-control policies beyond networks under their direct administration. For example, the systems and methods described herein may configure and provide to a child an access-controlled network that conforms to an access-control policy set by the child's parents for their home network. Likewise, the systems and methods described herein may configure and provide to an employee an access-controlled network that conforms to the access-control policy established by his or her employer on an organizational network.

Figure 5:
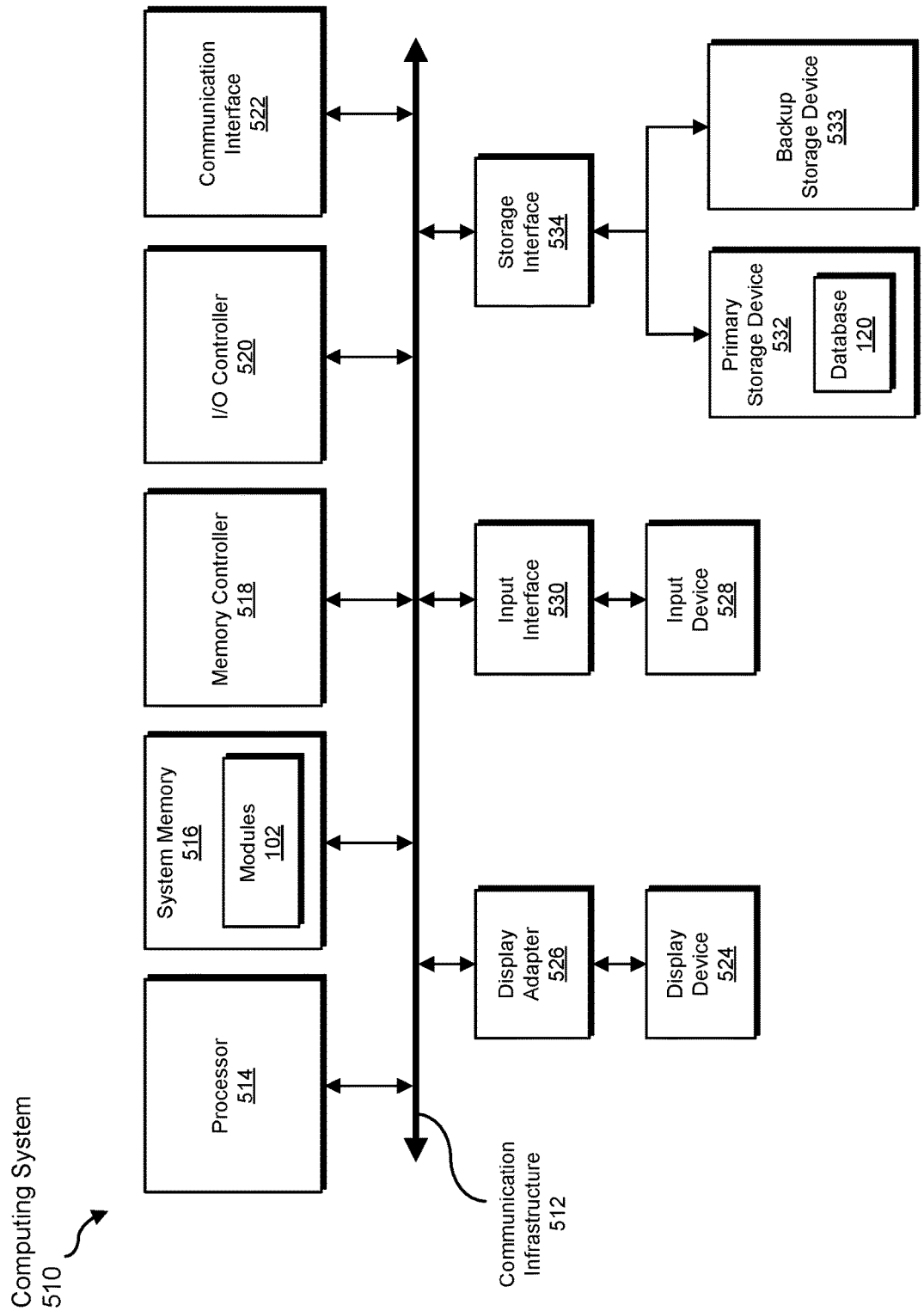
FIG. 5 is a block diagram of an illustrative computing system capable of implementing one or more of the embodiments described and/or illustrated herein.

FIG. 5 is a block diagram of an illustrative computing system 510 capable of implementing one or more of the embodiments described and/or illustrated herein. For example, all or a portion of computing system 510 may perform and/or be a means for performing, either alone or in combination with other elements, one or more of the steps described herein (such as one or more of the steps illustrated in FIG. 3). All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of physical processing unit (e.g., a hardware-implemented central processing unit) capable of processing data or interpreting and executing instructions. In certain embodiments, processor 514 may receive instructions from a software application or module. These instructions may cause processor 514 to perform the functions of one or more of the embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, illustrative computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between illustrative computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, illustrative computing system 510 may also include at least one input device 528 coupled to communication infrastructure 512 via an input interface 530. Input device 528 generally represents any type or form of input device capable of providing input, either computer or human generated, to illustrative computing system 510. Examples of input device 528 include, without limitation, a keyboard, a pointing device, a speech recognition device, or any other input device.

As illustrated in FIG. 5, illustrative computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510. In one example, database 120 from FIG. 1 may be stored in primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the illustrative embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the illustrative embodiments described and/or illustrated herein. Additionally or alternatively, one or more of the illustrative embodiments described and/or illustrated herein may be implemented in firmware and/or hardware. For example, computing system 510 may be configured as an Application Specific Integrated Circuit (ASIC) adapted to implement one or more of the illustrative embodiments disclosed herein.

Figure 6:
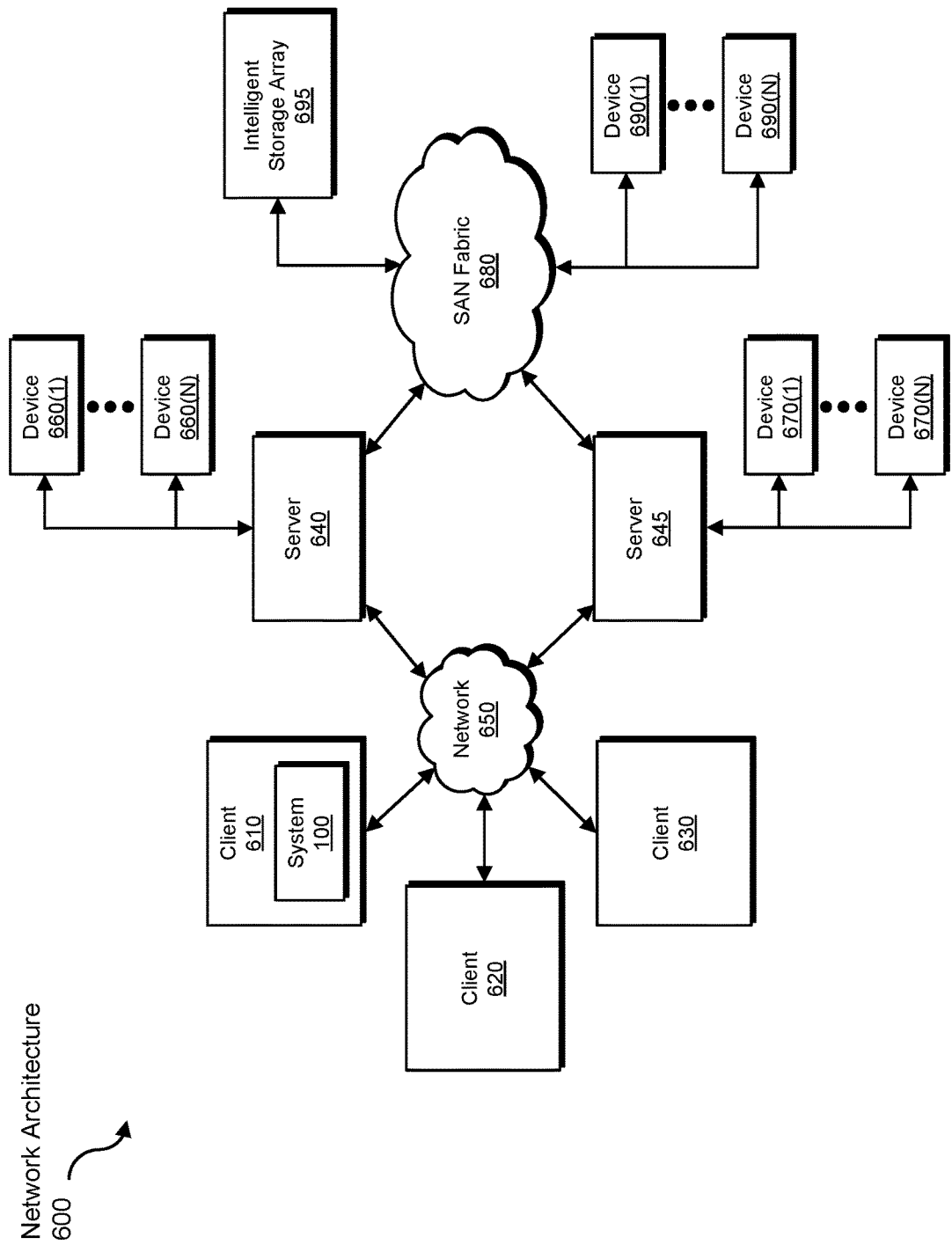
FIG. 6 is a block diagram of an illustrative computing network capable of implementing one or more of the embodiments described and/or illustrated herein.

FIG. 6 is a block diagram of an illustrative network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the steps disclosed herein (such as one or more of the steps illustrated in FIG. 3). All or a portion of network architecture 600 may also be used to perform and/or be a means for performing other steps and features set forth in the instant disclosure.

Client systems 610, 620, and 630 generally represent any type or form of computing device or system, such as illustrative computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to illustrative computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the illustrative embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the illustrative embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an illustrative method for enforcing access-control policies.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered illustrative in nature since many other architectures can be implemented to achieve the same functionality.

In some examples, all or a portion of illustrative system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of illustrative system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of illustrative system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of illustrative system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of illustrative system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of illustrative system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of illustrative system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various methods described and/or illustrated herein may also omit one or more of the steps described or illustrated herein or include additional steps in addition to those disclosed.

While various embodiments have been described and/or illustrated herein in the context of fully functional computing systems, one or more of these illustrative embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the illustrative embodiments disclosed herein.

In addition, one or more of the modules described herein may transform data, physical devices, and/or representations of physical devices from one form to another. For example, one or more of the modules recited herein may receive client connection data to be transformed, transform the client connection data, output a result of the transformation to identify an access-control policy, use the result of the transformation to configure an access-controlled network, and store the result of the transformation to make the access-controlled network available to the client. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the illustrative embodiments disclosed herein. This illustrative description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for enforcing access-control policies, at least a portion of the method being performed by a computing device comprising at least one processor, the method comprising:

detecting, at a network device for configuring networks according to access-control policies, an attempt to connect a client to an access-controlled network, wherein the attempt includes a network identifier corresponding to a prior access-controlled network previously accessed by the client;

providing, via the network device, a guest network to allow the client to contact a server in association with the attempt to connect the client to the access-controlled network;

determining, by the server, the network device is available to configure the access-controlled network;

identifying, by the server, the prior access-controlled network previously accessed by the client by determining, from the attempt to connect the client to the access-controlled network, the network identifier corresponding to the prior access-controlled network;
identifying and retrieving, from the server, an access-control policy that applies to the access-controlled network, wherein the access-control policy is identified based at least on a policy associated with the network identifier and having previously been applied to the client to connect to the prior access-controlled network;
instructing, by the server, the network device to configure the access-controlled network by establishing, based on the network identifier, a network configured to enforce one or more provisions of the access-control policy;
notifying the client that the access-controlled network is available; and
connecting the client to the access-controlled network.

2. The computer-implemented method of claim 1, wherein:
detecting the connection attempt comprises detecting a request from the client to connect to the access-controlled network.

3. The computer-implemented method of claim 1, wherein:
detecting the connection attempt comprises detecting the network device capable of configuring networks according to access-control policies.

4. The computer-implemented method of claim 1, wherein the client requests, via a mobile device network, the access-control policy server to provide the access-control policy to the network device.

5. The computer-implemented method of claim 1, wherein the client requests, via a public network, the access-control policy server to provide the access-control policy to the network device.

6. The computer-implemented method of claim 5, wherein the public network is provided by the network device.

7. The computer-implemented method of claim 1, wherein:
detecting the attempt to connect the client to the access-controlled network comprises receiving, at the access-control policy server, a request to identify the network device, the request comprising at least one network device identifier; and
identifying the access-control policy that applies to the access-controlled network comprises:
receiving, at the access-control policy server, identification of the access-control policy; and
providing the access-control policy to the network device.

8. A system for enforcing access-control policies, the system comprising:
a connection module, stored in memory, that detects, at a network device for configuring networks according to access-control policies, an attempt to connect a client to an access-controlled network, and, in response to detecting the attempt, provides, via the network device, a guest network to allow the client to contact the system in association with the attempt, wherein the attempt includes a network identifier corresponding to a prior access-controlled network previously accessed by the client;
a policy module, stored in memory, that:
identifies the prior access-controlled network previously accessed by the client by determining, from the attempt to connect the client to the access-controlled network, the network identifier corresponding to the prior access-controlled network, and
identifies and retrieves an access-control policy that applies to the access-controlled network based at least on a policy associated with the network identifier and having previously been applied to the client to connect to the prior access-controlled network;
a configuration module, stored in memory, that instructs the network device to configure the access-controlled network by establishing, based on the network identifier, a network configured to enforce one or more provisions of the access-control policy;
a notification module, stored in memory, that notifies the client that the access-controlled network is available and enables the client to connect to the access-controlled network; and
at least one physical processor configured to execute the connection module, the policy module, the configuration module, and the notification module.

9. The system of claim 8, wherein:
the connection module detects the connection attempt by detecting a request from the client to connect to the access-controlled network.

10. The system of claim 8, wherein:
the connection module detects the connection attempt by detecting the network device capable of configuring networks according to access-control policies.

11. The system of claim 8, wherein the client requests, via a mobile device network, the access-control policy server to provide the access-control policy to the network device.

12. The system of claim 8, wherein the client requests, via a public network, the access-control policy server to provide the access-control policy to the network device.

13. The system of claim 12, wherein the public network is provided by the network device.

14. The system of claim 8, wherein:
the connection module detects the attempt to connect the client to the access-controlled network by receiving, at the access-control policy server, a request to identify the network device, the request comprising at least one network device identifier; and
the policy module identifies the access-control policy that applies to the access-controlled network by:
receiving, at the access-control policy server, identification of the access-control policy; and
providing the access-control policy to the network device.

15. A non-transitory computer-readable medium comprising one or more computer-readable instructions that, when executed by at least one processor of a computing device, cause the computing device to:
detect, at a network device for configuring networks according to access-control policies, an attempt to connect a client to an access-controlled network, wherein the attempt includes a network identifier corresponding to a prior access-controlled network previously accessed by the client;
provide, via the network device, a guest network to allow the client to contact a server in association with the attempt to connect the client to the access-controlled network;
determine the network device is available to configure the access-controlled network;
identify the prior access-controlled network previously accessed by the client by determining, from the attempt to connect the client to the access-controlled network, the network identifier corresponding to the prior access-controlled network;
identify and retrieve an access-control policy that applies to the access-controlled network based at least on a policy associated with the network identifier and having previously been applied to the client to connect to the prior access-controlled network;

instruct the network device to configure the access-controlled network by establishing, based on the network identifier, a network configured to enforce one or more provisions of the access-control policy;

notify the client that the access-controlled network is available; and enable the client to connect to the access-controlled network.

16. The non-transitory computer-readable medium of claim 15, wherein the one or more computer-readable instructions cause the computing device to:

detect the connection attempt by detecting a request from the client to connect to the access-controlled network.

17. The non-transitory computer-readable medium of claim 15, wherein the one or more computer-readable instructions cause the computing device to:

detect the connection attempt by detecting the network device capable of configuring networks according to access-control policies.

18. The non-transitory computer-readable medium of claim 15, wherein the one or more computer-readable instructions cause the computing device to request, via a mobile device network, the access-control policy server to provide the access-control policy to the network device.

19. The non-transitory computer-readable medium of claim 15, wherein the one or more computer-readable instructions cause the computing device to request, via a public network, the access-control policy server to provide the access-control policy to the network device.

20. The non-transitory computer-readable medium of claim 19, wherein the one or more computer-readable instructions cause the computing device to:

detect the attempt to connect the client to the access-controlled network by receiving, at the access-control policy server, a request to identify the network device, the request comprising at least one network device identifier; and identify the access-control policy that applies to the access-controlled network by:

receiving, at the access-control policy server, identification of the access-control policy; and providing the access-control policy to the network device.

\* \* \* \* \*

UNITED STATES PATENT AND TRADEMARK OFFICE
CERTIFICATE OF CORRECTION

PATENT NO.        : 10,673,899 B1
APPLICATION NO.   : 15/156719
DATED             : June 2, 2020
INVENTOR(S)       : Justin Harmon It is certified that error appears in the above-identified patent and that said Letters Patent is hereby corrected as shown below:

On the Title Page

On page 2, in Column 2, item (56), Other Publications, Line 4, delete "et al..;" and insert -- et al., -- therefor.

Signed and Sealed this
Twenty-first Day of July, 2020

Andrei Iancu
*Director of the United States Patent and Trademark Office*